United States Patent
Ryoo et al.

(10) Patent No.: US 10,158,704 B2
(45) Date of Patent: Dec. 18, 2018

(54) METHOD AND SYSTEM FOR CLUSTERING DISTRIBUTED OBJECTS TO USE THEM AS IF THEY WERE ONE OBJECT

(71) Applicant: TMAXSOFT. CO., LTD., Gyeonggi-do (KR)

(72) Inventors: Kyoung Min Ryoo, Gyeonggi-do (KR); Kyung Koo Yoon, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 244 days.

(21) Appl. No.: 15/140,823

(22) Filed: Apr. 28, 2016

(65) Prior Publication Data
US 2017/0264678 A1 Sep. 14, 2017

(51) Int. Cl.
*G06F 15/173* (2006.01)
*H04L 29/08* (2006.01)
*H04L 29/06* (2006.01)

(52) U.S. Cl.
CPC .......... *H04L 67/1017* (2013.01); *H04L 67/42* (2013.01)

(58) Field of Classification Search
CPC ............................ H04L 67/1017; H04L 67/42
USPC ....................................................... 709/238
See application file for complete search history.

(56) References Cited

U.S. PATENT DOCUMENTS 7,313,619 B2 * 12/2007 Torrant ................. H04L 41/046
709/202
8,315,636 B2 * 11/2012 Moon ................... G01S 5/0072
370/338
8,589,471 B2 * 11/2013 Whitney ............... G06F 9/5055
709/201
2002/0055972 A1 * 5/2002 Weinman, Jr. ...... G06F 11/2058
709/203
2002/0199036 A1 * 12/2002 Arnold .................... G06F 9/547
719/330

(Continued)

FOREIGN PATENT DOCUMENTS

JP 2000-172654 6/2000
KR 1020150111952 10/2015

OTHER PUBLICATIONS

Mateo, et al., "Dynamic Replication Scheme for Load Balancing the Distributed Object Group." the Proceedings of the International Conference on Hybrid Information Technology. 2006.

(Continued)

*Primary Examiner* — Phuoc H Nguyen
(74) *Attorney, Agent, or Firm* — Husch Blackwell LLP

(57) ABSTRACT

A method for clustering objects distributed in multiple servers to allow one or more distributed objects to be used as if they were one object is provided. The method includes steps of: (a) a specific server transmitting to a client a remote controller including a particular communication object capable of supporting communications between the client and the specific server; and (b) the specific server supporting the client to include at least one communication object, capable of supporting communications between the client and at least one server, respectively, except the specific server within the cluster, in the remote controller, to thereby support the client to be communicable with all the servers in the cluster by acquiring, and providing to the client, the at least one communication object by referring to information on all the servers within the cluster.

18 Claims, 3 Drawing Sheets

(56) References Cited

U.S. PATENT DOCUMENTS

| | | | |
|---|---|---|---|
| 2007/0156842 A1* | 7/2007 | Vermeulen | G06F 17/30212 709/217 |
| 2013/0173771 A1* | 7/2013 | Ditto | G06F 11/1438 709/223 |
| 2014/0006473 A1* | 1/2014 | Raghunathan | G06F 9/548 709/201 |
| 2014/0074904 A1* | 3/2014 | Givelberg | H04L 67/10 709/201 |
| 2015/0128152 A1* | 5/2015 | Lachaume | G06F 9/4428 719/316 |
| 2016/0065498 A1* | 3/2016 | Harper | H04L 47/826 709/223 |
| 2016/0205190 A1* | 7/2016 | Bestler | G06F 17/30312 709/217 |

OTHER PUBLICATIONS

Kuz, et al., "Replicated Web objects: Design and implementation." Proc. Fourth Annual ASCI Conference, Lommel, Belgium. 1998.

* cited by examiner

METHOD AND SYSTEM FOR CLUSTERING DISTRIBUTED OBJECTS TO USE THEM AS IF THEY WERE ONE OBJECT

CROSS REFERENCE TO RELATED APPLICATION

This application claims priority to and incorporates herein by reference all disclosure in Korean Patent Application No. 10-2016-0028529 filed Mar. 9, 2016.

FIELD OF THE INVENTION

The present invention relates to a method and a system for clustering distributed objects as if they were one object; and more particularly, to the method, and the system for clustering the objects distributed in several devices or virtual machines (VMs) in Java to use the distributed objects as if they were one object.

BACKGROUND OF THE INVENTION

As the web technology has been developed, the number of users accessing servers has increased rapidly and a technology for distributing load is required to thereby provide one same service in use of several servers because the exponentially increasing number of users is too much for only one server to handle. The technology of distributing load by grouping several servers capable of providing a same service is called as a clustering technology.

Distributed objects mean objects distributed in several devices or VMs. In general, the distributed objects may be considered as one object from the point of view of a client (or a user), but actually, they are objects operated in several servers and support a client to use resources of the several servers.

If one of the distributed objects is unavailable due to the failure in a corresponding device or a corresponding software logic during the use of such a distributed object, another object among the distributed objects may be used (i.e., a failover capability). Further, a load should be distributed to prevent the load from being concentrated on one object (i.e., load balancing capability). The failover capability and the load balancing capability may be implemented through the clustering technology.

Remote Method Invocation (RMI) is a technology for invoking objects existing in different VMs and making use of them, but it specifies only services in a one-to-one situation and does not specify the clustering technology. So the RMI technology is not appropriate for the distributed objects. In addition, the Common Object Request Broker Architecture (CORBA) as a technology for handling communication among objects in a distributed object environment sets forth object communication among a variety of languages but does not specify detailed matters about the failover capability or the load balancing capability.

SUMMARY OF THE INVENTION

It is an object of the present invention to solve all the aforementioned problems.

It is another object of the present invention to reduce network load by implementing a distributed object system in which at least one communication object required to access distributed objects and at least one operational logic required to allow only minimum resources to be used are provided.

It is still another object of the present invention to provide a service capable of allowing a user to use the objects distributed in Java servers as if they were one object even if internal logics of the servers are unknown while the failover capability and the load balancing capability are supported.

In accordance with one aspect of the present invention, there is provided a method for clustering objects distributed in multiple servers to allow one or more distributed objects to be used as if they were one object, including steps of: (a) a specific server among the multiple servers determined to be included in a cluster transmitting to a client a remote controller including a particular communication object capable of supporting communications between the client and the specific server, if a request for using a distribution object is transmitted from the client; and (b) the specific server supporting the client to include at least one communication object, capable of supporting communications between the client and at least one server, respectively, except the specific server within the cluster, in the remote controller, to thereby support the client to be communicable with all the servers in the cluster by acquiring, and providing to the client, the at least one communication object by referring to information on all the servers within the cluster.

In accordance with another aspect of the present invention, there is provided a server system for clustering objects distributed in multiple servers to allow one or more distributed objects to be used as if they were one object, including: a communication part of a specific server among the multiple servers, which are included in the server system and are determined to be included in a cluster, for (i) transmitting to a client a remote controller including a particular communication object capable of supporting communications between the client and the specific server, if a request for using a distribution object is transmitted from the client; and (ii) supporting the client to include at least one communication object, capable of supporting communications between the client and at least one server, respectively, except the specific server within the cluster, in the remote controller, to thereby support the client to be communicable with all the servers in the cluster by acquiring, and providing to the client, the at least one communication object by referring to information on all the servers within the cluster; and a processor of the specific server.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
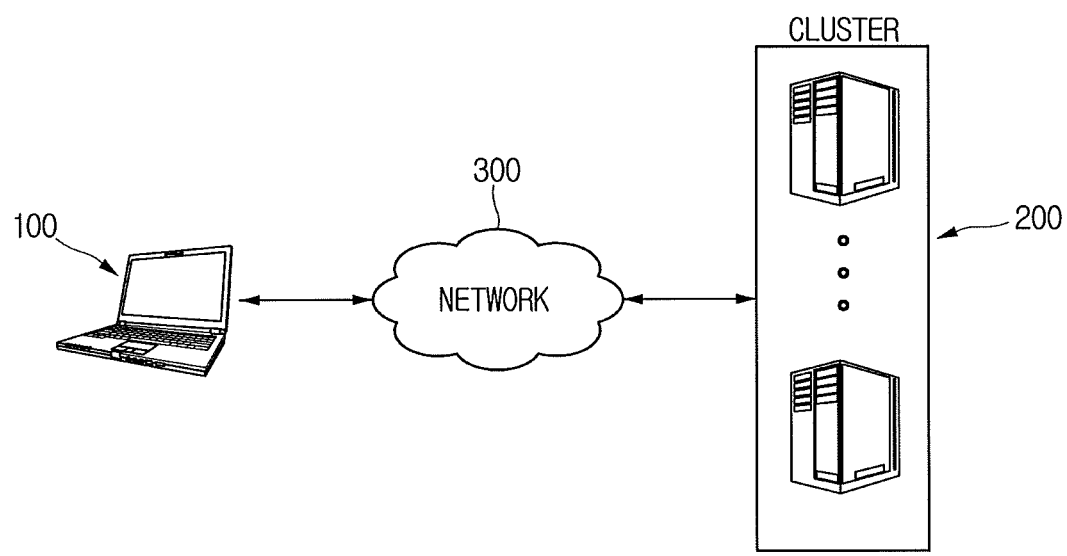
FIG. 1 is a diagram illustrating an overall configuration of a whole system to allow distributed objects to be accessed as if they were one object in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 is a diagram illustrating an overall configuration of a whole system to allow distributed objects to be accessed as if they were one object in accordance with one example embodiment of the present invention.

As illustrated in FIG. 1, the whole system in accordance with one example embodiment may be configured by including a client 100, servers included in a cluster 200, and a communication network 300.

First of all, any digital devices that may include a function of accessing, and communicating with, the servers in the cluster 200, may be adopted as the client 100 such as a desktop computer, a laptop computer, a workstation, a PDA, a webpad, a mobile phone, etc. which have memory means and microprocessors with a calculation ability in accordance with the present invention. In particular, the client 100 may acquire at least one communication object capable of accessing at least one distributed object (remote object) in at least one server in the cluster 200 from the at least one server in the cluster 200. The distributed object may represent an object in the server that the client 100 may access remotely.

Next, the server in the cluster 200 in accordance with one example embodiment of the present invention may include at least one distributed object the client 100 intends to access and the cluster 200 in accordance with one example embodiment of the present invention may include the multiple servers. The multiple servers within the cluster may include one or more distributed objects, respectively, that perform similar functions. If failure occurs in one server within the cluster, a service may be continuously provided through another server that properly works.

A configuration of the servers in the cluster 200 in accordance with the present invention will be explained in details below.

The communication network 300 in accordance with one example embodiment of the present invention may be configured in a wired or a wireless communication manner in a variety of communication networks including Wide Area Network (WAN), Local Area Network (LAN), telecommunication network, artificial satellite communication network, etc. More specifically, the communication network 300 in the present invention may also include a wireless communication network implemented by technologies such as IEEE 802.11, Code Division Multiple Access (CDMA), Wideband Code Division Multiple Access (WCDMA), Global System for Mobile communications (GSM), and Long Term Evolution (LTE). Without the need to be limited to these, the communication network 300, however, may also include at least part of publicly known wired or wireless communication networks, etc.

Figure 2:
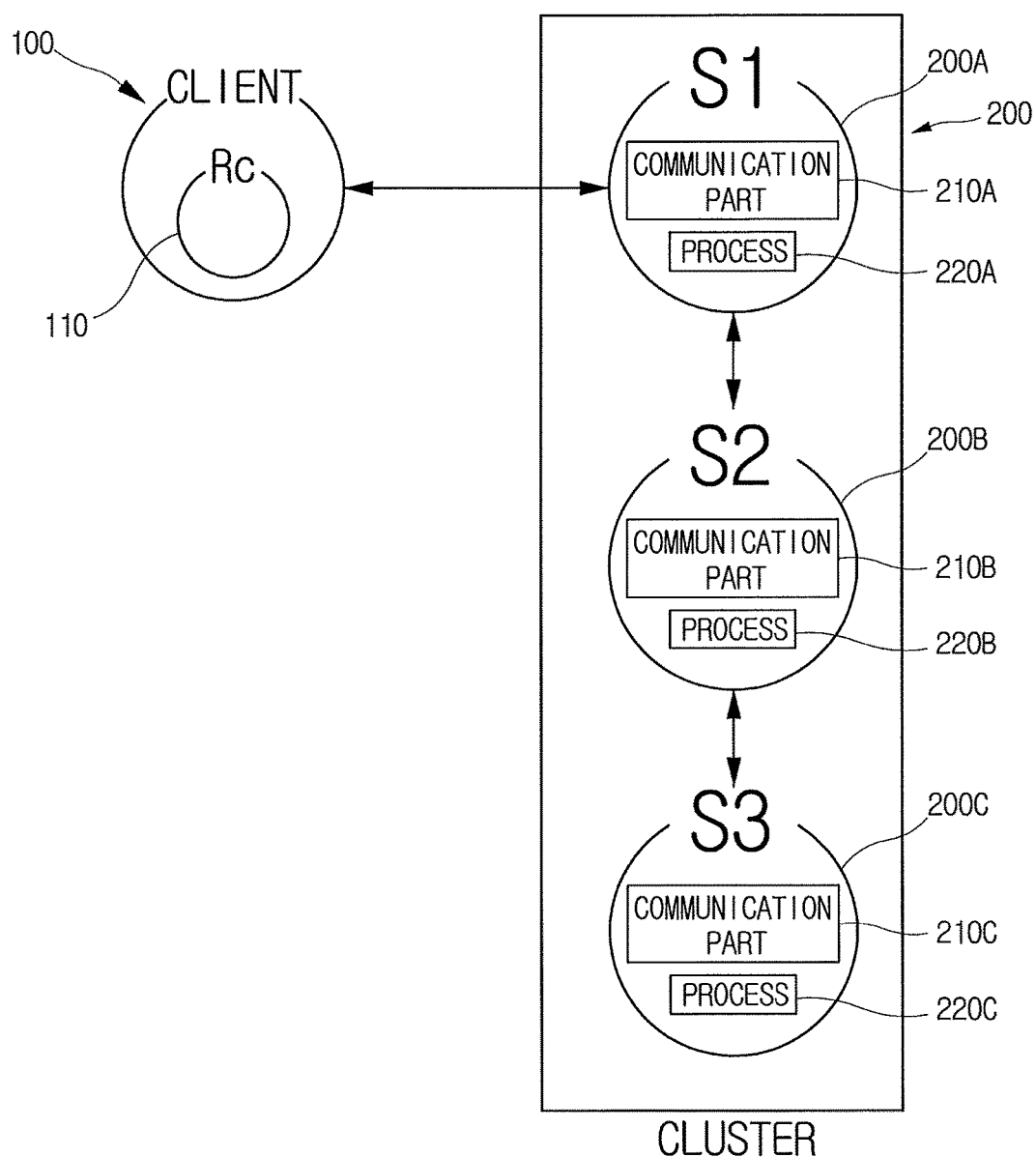
FIG. 2 is a drawing exemplarily showing a configuration of a distributed system in accordance with the present invention.

FIG. 2 is a drawing exemplarily showing a configuration of a distributed system in accordance with the present invention. FIG. 2 exemplarily shows that a first server 200A as S1, a second server 200B as S2, and a third server 200C as S3 are included within the cluster.

As illustrated in FIG. 2, the cluster 200 in accordance with one example embodiment of the present invention may include multiple servers S1, S2, and S3. The multiple servers S1, S2, and S3 may be configured by including communication parts 210A, 210B, and 210C and processors 220A, 220B, and 220C, respectively. Herein, it is not absolutely necessary for the communication parts and the processors to be physically included in all the distributed system and they could be located in external devices connected with the distributed system. In accordance with one example embodiment of the present invention, at least some of the communication part and the processor may be program modules that may communicate with the client 100. Such program modules may be included in the servers in a form of operating system, application program module and other program module or physically stored in various storage devices well known to those skilled in the art. Such program modules may include, but not be limited to a routine, a subroutine, a program, an object, a component, and a data structure for executing a specific operation or a type of specific abstract data that will be described in accordance with the present invention.

First of all, if a request for accessing a certain distribution object is transmitted from the client 100, a communication part of a specific server among the multiple servers included in the cluster 200 in accordance with one example embodiment of the present invention may transmit to the client 100 a remote controller 110 that includes a particular communication object capable of supporting a communication between the specific server and the client 100. At the time, the communication part of the specific server may also transmit security information and transaction information together with the remote controller 110.

Herein, the specific server, i.e., a server that preferentially provides a service to the client 100 among the multiple servers within the cluster 200, may be selected among the multiple servers in the cluster 200 by a randomly selected method or a Round Robin method.

By referring to information on all the servers within the cluster 200, the communication part of the specific server may additionally provide at least one communication object communicable with at least one server except the specific server within the cluster 200 to the client 100 so that the client 100 may include the at least one communication object in the remote controller 110.

Multiple servers within the cluster 200 may share the communication objects corresponding to the respective servers in the cluster 200 with each other and a time of sharing the communication objects may be when a request for accessing the distributed objects is transmitted from the client 100. As another example, the communication objects may be shared regardless of the client 100.

Herein, if a request for the at least one communication object communicable respectively with the at least one server except the specific server within the cluster 200 is transmitted from the client 100, the communication part of the specific server may transmit the at least one communication object. As another example, even if the request for the at least one communication object is not transmitted from the client 100, such communication object may be also automatically transmitted within a certain period of time after the remote controller 110 has been transmitted.

By referring to FIG. 2, if a request for accessing a distributed object has been transmitted from the client 100 and if the client 100 accesses a distributed object included in the first server 200A (S1) among the multiple servers S1, S2, and S3 included within the cluster 200, the communication part 210A of the first server 200A may transmit to the client 100 the remote controller 110 that contains a first communication object capable of supporting communication between the first server 200A and the client 100. In addition, the communication part 210A of the first server 200A may acquire, and provide to the client 100, a second and a third communication objects capable of supporting communication between the second server 200B (S2) and the client 100 and between the third server 200B (S3) and the client 100, respectively, by referring to information on all the servers within the cluster 200. Accordingly, the communication part 210A of the first server 200A may allow the second and the third communication objects to be included in the remote controller 110 in the client 100.

A clustering handler may be included in the remote controller 110 that the communication part of the specific server transmits to the client 100. If a specified distributed object that the client 100 intends to access is unavailable in the specific server or the specific server is determined to be under heavy load, the clustering handler may support the client 100 to use another distribution object, capable of performing the same function as the specified distributed object, in the at least one server except the specific server within the cluster 200.

Herein, what determines an operating status or a load status of the specific server may be a clustering handler or another server within the cluster 200. The clustering handler may support the client 100 to use another distribution object capable of performing the same function as the specified distributed object by communicating with the at least one server except the specific server within the cluster 200 through the communication objects included in the remote controller 110.

Additionally, if a request for accessing the specified distribution object is transmitted from the client 100, the clustering handler may also support the client 100 to communicate with one of the multiple servers to thereby access the specified distributed object. If a server is selected among multiple servers by the randomly selected method or the Round Robin method, the client 100 may be allowed to communicate with the server. Herein, what selects the server may be the clustering handler or another administrator within the cluster 200.

Figure 3:
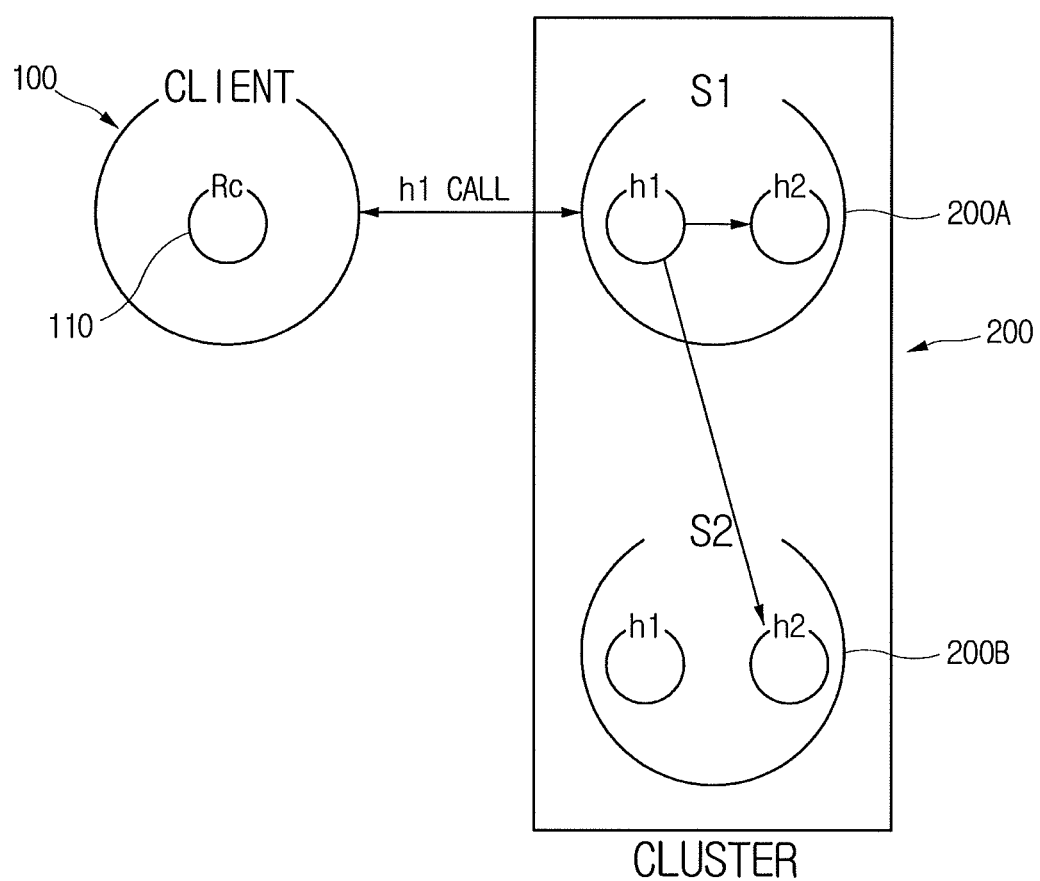
FIG. 3 is a diagram for exemplarily explaining how to use distributed objects when an object and its corresponding object are included in one same server in accordance with one example embodiment of the present invention.

Meanwhile, when the client 100 intends to use the specified distributed object in the specific server and the specified distributed object additionally calls an additional distribution object, the communication part of the specific server may also support the specified distributed object to preferentially call the additional distributed object in the same server, i.e., in the specific server. To explain this, FIG. 3 is provided as follows:

FIG. 3 is a diagram for exemplarily explaining how to access distributed objects when an object and its corresponding object are included in one same server in accordance with one example embodiment of the present invention.

By referring to FIG. 3, if the client 100 calls an object h1 in the first server 200A by using the remote controller 110, the communication part 210A of the first server 200A may allow the object h1 to call the object h2 of the first server 200A, although the object h2 is included in the first server 200A and the second server 200B respectively. Thus, the communication part 210A of the first server 200A can reduce network load because it does not call the object h2 of the second server 200B through network communications. However, if the first server 200A is under heavy load, the communication part 210A of the first server 200A may call the object h2 of the second server 200B.

The processor of the specific server in accordance with one example embodiment of the present invention may check the operating status of the servers in the cluster 200 regularly to identify whether the servers are operated properly or not and if any change in the operating status of the servers is detected, the specific server may register information on the change to a listener. Besides, the processor of the specific server may acquire at least one communication object communicable respectively with the at least one server, except the specific server, in the cluster 200 and register the at least one communication object to the listener.

The communication part of the specific server may provide such information, e.g., the operating status of severs or the information on the change in such status, to the client 100 and the client 100 could therefor identify the servers that properly work in the cluster 200. Herein, the processor of the specific server may also update information registered to the listener regularly, and as a result, the client 100 may check the current status of the servers in the cluster 200 continuously.

If failure occurs in the specific server, the communication part of the specific server may support another servers, except the specific server, in the cluster 200 to register their own information in the listener and then support the information to be provided to the client 100 through the listener. If failure occurs in the first server 200A after the first server 200A has provided information on all the servers to the client 100, the remote controller 110 of the client 100 may select a certain server among the servers registered in the listener and allow the client 100 to communicate with the certain server. It may acquire information on all the servers operated properly from the certain server through the listener.

The present invention has an effect of reducing network load by implementing the distributed object system in which the at least one communication object required to access the distributed objects and the at least one operational logic required to allow only minimum resources to be used are provided.

The present invention has another effect of providing a service capable of allowing a user to use the objects distributed in Java servers as if they were one object even if the internal logics of the servers are unknown while the failover capability and the load balancing capability are supported.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for clustering objects distributed in multiple servers to allow one or more distributed objects to be used as if they were one object, comprising steps of:
    (a) a specific server among the multiple servers determined to be included in a cluster transmitting to a client a remote controller including a particular communication object capable of supporting communications between the client and the specific server, if a request for using a distribution object is transmitted from the client; and
    (b) the specific server supporting the client to include at least one other communication object, capable of supporting communications between the client and at least one other server, respectively, except the specific server within the cluster, in the remote controller, to thereby support the client to be communicable with all the servers, including the specific server and said at least one other server, in the cluster by acquiring, and providing to the client, the at least one other communication object by referring to information on all the servers within the cluster;
    wherein the remote controller includes a clustering handler; and
    wherein, if a specified distributed object that the client intends to use is unavailable or the specific server is determined to be under heavy load, the clustering handler supports the client to use another distributed object, capable of performing the same function as the specified distributed object, selected among the distributed objects in the multiple servers, except the specific server, within the cluster.

2. The method of claim 1, wherein the remote controller includes a clustering handler; and wherein, if a request for using a specified distributed object is transmitted from the client, the clustering handler supports the client to communicate with one of the multiple servers to thereby allow the specified distributed object to be used.

3. The method of claim 2, wherein the clustering handler supports the client to communicate with a server selected among the multiple servers in the cluster by a randomly selected method or a Round Robin method.

4. The method of claim 1, wherein, if the client intends to use a specified distributed object in the specific server and the specified distributed object calls an additional distributed object, the specific server supports the specified distributed object to preferentially call the additional distributed object in the specific server.

5. The method of claim 1, wherein, at the step of (b), if a request for using at least one communication object communicable with at least one server, respectively, except the specific server within the cluster, is transmitted from the client, the specific server transmits the at least one communication object.

6. The method of claim 1, wherein the specific server transmits security information and transaction information when it transmits the remote controller to the client.

7. The method of claim 1, wherein the specific server checks operating status of the multiple servers within the cluster regularly to identify whether the multiple servers are operated properly or not and if any change in the operating status of the multiple servers is detected, the specific server registers the change to a listener and provides the change to the client through the listener.

8. The method of claim 1, wherein the specific server acquires, and registers to the listener, the at least one communication object communicable with the at least one server, respectively, except itself, within the cluster and then provides the at least one communication object to the client through the listener.

9. The method of claim 1, wherein, if failure occurs in the specific server, the specific server supports another server, except itself, within the cluster to register information on all the servers within the cluster to the listener and then to provide to the client the information on all the servers within the cluster through the listener.

10. A server system for clustering objects distributed in multiple servers to allow one or more distributed objects to be used as if they were one object, comprising:
    a communication part of a specific server among the multiple servers, which are included in the server system and are determined to be included in a cluster, for (i) transmitting to a client a remote controller including a particular communication object capable of supporting communications between the client and the specific server, if a request for using a distribution object is transmitted from the client; and (ii) supporting the client to include at least one other communication object, capable of supporting communications between the client and at least one other server, respectively, except the specific server within the cluster, in the remote controller, to thereby support the client to be communicable with all the servers, including the specific server and said at least one other server, in the cluster by acquiring, and providing to the client, the at least one other communication object by referring to information on all the servers within the cluster; and
    a processor of the specific server;
    wherein the remote controller includes a clustering handler; and
    wherein, if a specified distributed object that the client intends to use is unavailable or the specific server is determined to be under heavy load, the clustering handler supports the client to use another distributed object, capable of performing the same function as the specified distributed object, selected among the distributed objects in the multiple servers, except the specific server, within the cluster.

11. The server system of claim 10, wherein the remote controller includes a clustering handler; and wherein, if a request for using a specified distributed object is transmitted from the client, the clustering handler supports the client to communicate with one of the multiple servers to thereby allow the specified distributed object to be used.

12. The server system of claim 11, wherein the clustering handler supports the client to communicate with a server selected among the multiple servers in the cluster by a randomly selected method or a Round Robin method.

13. The server system of claim 10, wherein, if the client intends to use a specified distributed object in the specific server and the specified distributed object calls an additional distributed object, the specific server supports the specified distributed object to preferentially call the additional distributed object existing in the specific server.

14. The server system of claim 10, wherein, if a request for using at least one communication object communicable with at least one server, respectively, within the cluster except the specific server is transmitted from the client, the specific server transmits the at least one communication object.

15. The server system of claim 10, wherein the communication part of the specific server transmits security information and transaction information when it transmits the remote controller to the client.

16. The server system of claim 10, wherein the processor of the specific server checks operating status of the multiple servers within the cluster regularly to identify whether the multiple servers are operated properly or not and if any change in the operating status of the multiple servers is detected, the specific server registers the change to a listener and provides the change to the client through the listener.

17. The server system of claim 10, wherein the processor of the specific server acquires, and registers to the listener, the at least one communication object communicable with the at least one server, respectively, within the cluster except the specific server and then provides the at least one communication object to the client through the listener.

18. The server system of claim 10, wherein, if failure occurs in the specific server, the communication part of the specific server supports another server belonging to the cluster other than the specific server to register information on all the servers within the cluster to the listener and then provide the information on all the servers within the cluster to the client through the listener.

\* \* \* \* \*